J. A. PEARSON.
PISTON.
APPLICATION FILED JAN. 30, 1920.

1,366,415.

Patented Jan. 25, 1921.

Inventor
John A. Pearson.

By Howard E Barlow
Attorney

UNITED STATES PATENT OFFICE.

JOHN A. PEARSON, OF PROVIDENCE, RHODE ISLAND.

PISTON.

1,366,415.     Specification of Letters Patent.     Patented Jan. 25, 1921.

Application filed January 30, 1920. Serial No. 355,131.

*To all whom it may concern:*

Be it known that I, JOHN A. PEARSON, a citizen of the United States, and resident of the city of Providence, in the county of Providence and State of Rhode Island, have invented certain new and useful Improvements in Pistons, of which the following is a specification.

This invention relates to improvements in the construction of expandible pistons; and has for its object to provide an expandible shell-member formed in halves and mounted in a reduced portion of the piston body, to be pressed outwardly against the cylinder walls to take up wear of either the piston or cylinder and so eliminate noise due to such wear while in operation.

A further object of the invention is to so form the piston body and the shell that the full length of bearing for the wrist pin will not be interfered with.

A still further object of the invention is to provide spring-receiving pockets in the walls of the piston body in which pockets springs are carried to expand the shell halves.

With these and other objects in view, the invention consists of certain novel features of construction; as will be more fully described and particularly pointed out in the appended claims.

Figure 1:
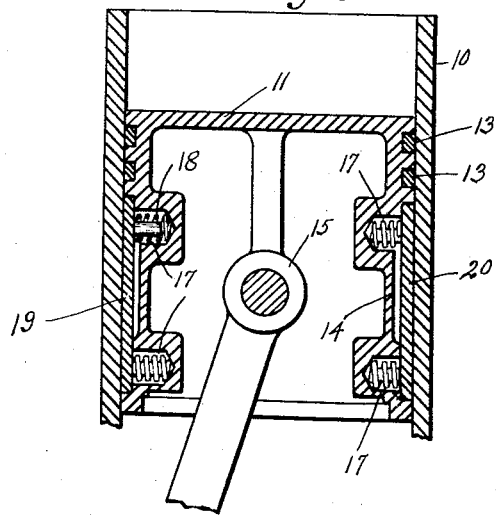

In the accompanying drawings:

Figure 1— is a sectional side elevation illustrating my improved piston mounted in a cylinder and showing the springs acting on the shell halves to press them outwardly against the cylinder walls.

Figure 2:
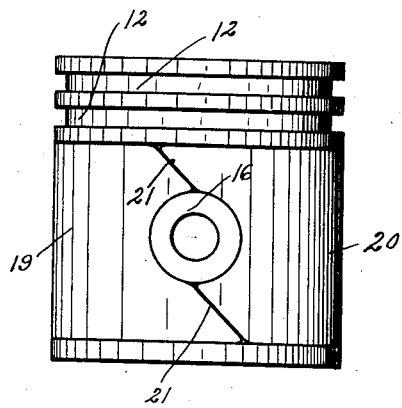

Fig. 2— is a side elevation of a piston body showing my improved shell halves in position thereon.

Figure 3:
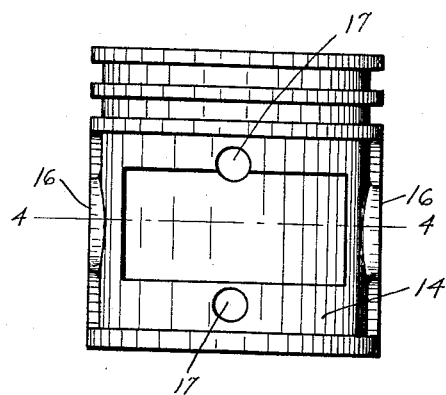

Fig. 3— is a sectional side elevation showing one of the halves of the shell removed.

Figure 4:
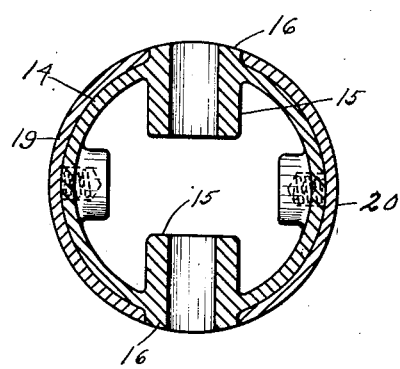

Fig. 4— is a sectional end view on line 4—4 of Fig. 3, through the wrist pin bearings, showing the outer ends of these bearings as extended to the outer diameter of the piston.

Figure 5:
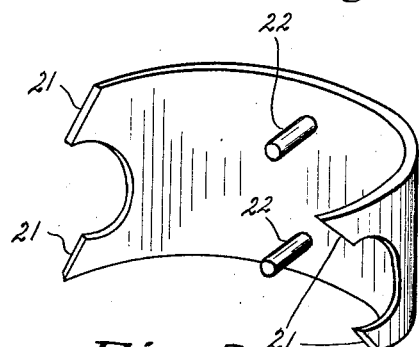

Fig. 5— is a perspective view showing the inner surfaces of one of the shell halves.

With reference to the drawings, 10 represents a portion of a cylinder in which my improved piston 11 is mounted. This piston is provided with a body portion, the upper part of which is shown as having two annular grooves 12 in which the usual spring piston rings 13 are mounted. Below these grooves I have reduced the diameter of the body portion of this piston as at 14, forming a wide, annular groove therein; the wrist pin bearings 15, however, are not affected by this reduction in diameter of the body portion as the outer portions 16 of these bearings extend to the outer diameter of the piston thereby insuring the maximum length of bearing for these wrist pins, which is of importance.

Within the area of this reduced body portion I have also provided pockets or recesses 17 formed in the walls thereof in which are set coil springs 18 for the purpose presently described.

In this reduced portion of the piston-body I have mounted an expandible shell made in halves 19 and 20, which halves have meeting edges 21 cut at an angle to the axis of piston both above and below the bearing 16 so as to preserve the substantially-continuous bearing of these meeting edges in the piston even though, at these edges, the halves are slightly separated, the hubs serving as stops to prevent the shell halves from rotating on the piston body.

Extending inwardly from the inner surface of each half about midway between its side edges I have provided two spaced apart guide pins 22 one above the other, which are adapted to project into the coils of the springs 18 and hold them in operative alinement.

It will be noted by my improved construction of piston having expandible walls that the shell halves are mounted to extend or spread in directions at right angles to the axis of the wrist pin as it is in these directions that the piston and the cylinder walls receive the greatest wear due to the angularity of thrust on the connecting rod, and by my improved construction the wear on both the piston and the cylinder walls are taken up simultaneously.

By this construction a number of advantages over the ordinary piston is obtained; first, the wear is taken up automatically thereby preventing side slapping and noise of the pistons running in the cylinders; second, these walls will yield and so prevent scoring the cylinders which sometimes occurs when the pistons expand excessively due to over-heating; and third, when these shells become worn excessively they may be readily removed and replaced by fresh ones thus obviating the necessity of making new pistons or reboring the cylinders.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. A piston comprising a body portion having a plurality of annular grooves in which expandible rings are carried, said body below said grooves being reduced in diameter for a portion of its length, wrist pin bearing hubs, the other ends of said hubs extending into said reduced body portion, a broad surfaced expandible shell member formed in halves and fitted to slide laterally in said reduced portion, the meeting edges of said shell halves engaging said hub ends to prevent relative rotation of said shell, and springs acting upon said halves to press them outwardly against the cylinder walls.

2. A piston comprising a body portion reduced in diameter for a portion of its length, wrist pin bearing hubs extending into said reduced portion substantially flush with the circumference of the piston, a shell member formed in halves expandible in said reduced portion, the end edges of said shell halves meeting above and below said hub and said edges being fitted around said bearing hub to prevent relative rotation on the piston body, and spring means acting on said halves to press them outwardly against the cylinder walls.

3. A piston comprising a body portion having a plurality of annular grooves, expandible rings in said grooves, said body below said grooves being reduced in diameter for a portion of its length, wrist pin bearing hubs, the outer ends of said hubs extending into said reduced body portion, an expandible shell member formed in halves and fitted to slide in said reduced portion, the meeting ends of said halves being cut on an angle both above and below said hubs, said ends being also shaped to fit around said bearing hubs whereby the expanding motion of said halves is at right angles to the axis of the wrist pin, and springs acting to press said halves outwardly.

4. A piston comprising a body portion having a plurality of annular grooves, expandible rings in said grooves, said body below said grooves being reduced in diameter for a portion of its length, pockets formed in the walls of the reduced portion of said body, an expandible shell member formed in halves and fitted to slide laterally in said reduced portion, coil springs in said pockets acting to press said halves outwardly, and guide pins fixed in the walls of said halves extending into said springs to guide their action.

In testimony whereof I affix my signature.

JOHN A. PEARSON.